(12) United States Patent
Sauermann

(10) Patent No.: US 7,797,286 B2
(45) Date of Patent: Sep. 14, 2010

(54) SYSTEM AND METHOD FOR EXTERNALLY PROVIDING DATABASE OPTIMIZER STATISTICS

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 417 days.

(21) Appl. No.: 10/851,013

(22) Filed: May 21, 2004

(65) Prior Publication Data

US 2005/0262158 A1 Nov. 24, 2005

(51) Int. Cl.
*G06F 17/20* (2006.01)
*G06F 15/16* (2006.01)

(52) U.S. Cl. .................. 707/688; 707/719

(58) Field of Classification Search .......... 707/688, 707/719
See application file for complete search history.

(56) References Cited

U.S. PATENT DOCUMENTS

| | | | |
|---|---|---|---|
| 6,012,054 A * | 1/2000 | Seputis | 707/3 |
| 6,088,694 A * | 7/2000 | Burns et al. | 707/8 |
| 6,356,889 B1 * | 3/2002 | Lohman et al. | 707/2 |
| 6,470,333 B1 * | 10/2002 | Baclawski | 707/3 |
| 6,535,870 B1 * | 3/2003 | Friske et al. | 707/2 |
| 6,636,873 B1 * | 10/2003 | Carini et al. | 707/201 |
| 2002/0010701 A1 * | 1/2002 | Kosciuszko et al. | 707/100 |
| 2002/0198899 A1 * | 12/2002 | Yamaguchi et al. | 707/200 |
| 2004/0148302 A1 * | 7/2004 | McKay et al. | 707/101 |
| 2005/0049945 A1 * | 3/2005 | Bourbonnais et al. | 705/30 |

* cited by examiner

*Primary Examiner*—Jean B. Fleurantin
*Assistant Examiner*—Alex Gofman
(74) *Attorney, Agent, or Firm*—Kenyon & Kenyon LLP

(57) ABSTRACT

The present invention relates to a method and system for using an external program to generate and update statistical information used by a database optimizer for at least one of a database and a database management system, at least one table of data being replicated from the database to the external program, the external program generating statistical information on the replicated data and sending the generated statistical information back to the database for use with the optimizer. The replicated data residing with the external program may also be used by an application for the execution of database queries instead of the database itself with the application using a list of replicated tables or replicated data to determine where to target its queries.

34 Claims, 2 Drawing Sheets

SYSTEM AND METHOD FOR EXTERNALLY PROVIDING DATABASE OPTIMIZER STATISTICS

FIELD OF THE INVENTION

The present invention relates to a system and method for provided externally determined database optimizer statistics.

BACKGROUND OF THE INVENTION

Database management systems (DBMS), including both hierarchical and relational DBMS, receive a database query from a user and return results to the user. Relational database management systems (RDBMS) such as Oracle®, IBM DB2®, and Microsoft SQL server®, among others, are no exception. A DBMS receives a database query from a user and uses the search criteria provided in the query to find and return results to the user. These results may be actual data or statistical information about the data. For example, a query may return all records/rows concerning transactions initiated by a customer—actual data in the database—or may return the number of transactions initiated by a customer—statistical information about the data.

Queries are generally formulated using a standardized query description language. For example, Structured Query Language (SQL) is a widely used standardized query description language that many DBMS use. Queries may be submitted to a DBMS from diverse types of users. For example, a person submitting queries to the DBMS using a native DBMS tool may be one such user. In this example, a user may be provided with a SQL statement editor allowing immediate execution of SQL statements on a database by the DBMS. In another example, a script file may connect to the DBMS and fire SQL statements against a database. In this example, the external script file is the user. In a third example, an external application may translate a user interface (UI) action into SQL statements that are sent to the DBMS with the external application receiving and translating the results from the DBMS into an appropriate representation on the external application UI. These examples are indicative of the broad range of users—e.g., individuals, scripts, and software applications—that may submit queries to a DBMS.

DBMS generally use an optimizer to facilitate execution of a query. The optimizer calculates the most efficient way or more efficient ways to retrieve and access the data stored in a database. There are many constraints that effect the way in which an optimizer makes these calculations. For example, the optimizer may consider whether one or more indices exist that can be used to reduce the time and resources needed to retrieve the queried data. The value of these indices in expediting the query is relative to their selectivity. For example, the greater the ratio of the number of records/rows filtered or sampled by the index to the total number of records/rows in the table (1:5 being greater than 1:10), the lower the selectivity of the index and the less utility provided by using the index. On the other hand, the lower the ratio of filtered records/rows to total records/rows, the higher the selectivity and the greater the utility to the optimizer in using the index in conducting the query. In another example, value distribution information for data in a table of a database may be used to expedite a query. Value distribution information loses its importance as it becomes less current as a result of changes made to the table data.

In general, two main types of database optimizer exist— Rule Based Optimizer (RBO) and Cost Based Optimizer (CBO). RBO use heuristic rules in determining the best method to access the queried data. CBO uses statistical information about the table data and the corresponding table indices in determining the best method to access the queried data. RBO do not typically rely on statistical information and table indices and, therefore, improvements in the collection of such information generally do not improve the performance of RBO. On the other hand, CBO performance is directly related to the quality of this statistical information and the table indices and the frequency with which they are updated.

Statistical information about table data becomes increasingly obsolete as changes are made to a database table. The degree of obsolescence is related to the frequency of change to the database table data and the amount of elapsed time since the last updating of the statistical information. For this reason, it is important for the statistical information to be updated regularly in order to maintain adequate CBO performance. The process for updating statistical information is usually scheduled by the database administrator who weighs the performance cost to the database management system during the update of the statistical information with the need to maintain adequate CBO performance. A typical result of obsolete statistical information is the CBO initiating a more resource or time intensive retrieval of the queried information thereby decreasing query performance and potentially impacting the response times of other users also connected to and executing queries on the database. Restating this in terms of cost, a CBO using obsolete statistical information may execute more expensive queries.

A database management system will typically include functionality to update the statistical information and indices for database tables. However, creating or updating this statistical information may considerably tie up database resources in a resource expensive manner. Typically, the resource expenses associated with updating statistical information for larger tables are greater and more apparent than for smaller tables. As previously stated, the process for updating statistical information is usually scheduled by the database administrator who weighs the performance cost to the database management system during the update of the statistical information with the need to maintain adequate CBO performance. The updating of the statistical information may have a large cost resulting in significant degradation in database management system services during the period of the update. For this reason, the updating of statistical information is generally scheduled for periods of limited user activity on the database.

Compounding the difficulty in this scheduling are situations where a database and database management system serve users requiring more consistent twenty-four hour access. Under these circumstances, it is often difficult or impossible to schedule the updating of statistical information without impacting other users. In order to minimize the impact on users, the database management system may not use all the records/rows in a table when determining table statistics and may instead use a sample from the records/rows in the table. The use of samples expedites the updating of the statistical information reducing the impact on users. However, the use of samples may result in less accurate statistical information resulting in more expensive CBO queries. In other words, the quality of the statistical information generated using samples can not be guaranteed and may not be as accurate.

Significant performance improvements can be achieved if statistical information is updated using the full table data or otherwise in a manner avoiding the expense to the database management system and the impact on database users that current updating of statistical information poses.

SUMMARY OF THE INVENTION

In one embodiment of the present invention, data is replicated from a database to an external program (e.g., a search engine) to provide faster access to the data for an application. During the process of indexing this replicated data for the external program, statistical data is produced. This statistical data may be provided to the database as a beneficial effect of the replication of the data according to this embodiment. This embodiment solves the above problems by providing faster access to the data through an external program such as a search engine while relieving some or all of the burden on the DBMS to generate and update optimizer statistics.

In one embodiment of the present invention, an external program is used to calculate statistical information in order to achieve the desired performance improvements. According to this embodiment, an external program stores replicated information from one or more tables in a database, calculates statistics for the replicated tables, and returns the calculated statistical information to the database management system (DBMS). An external program is a separate program or process (i.e., separate from the DBMS and database) that may run on the same computer or hardware as the database and/or DBMS or may run on other hardware.

In one embodiment of the present invention, at least one table of data is replicated from a database to an external program. The external program generates statistical data for the replicated tables of data and transmits the generated statistical data back to the database. The DBMS CBO may then use this generated statistical data to provide better optimization of database queries. The generated statistical data may include, for example, histograms, value distributions, and selectivity data along with any other information used by the CBO for database request (i.e., query) optimization. This embodiment may be used with both relational and hierarchical databases and is not limited to one particular type of database. The external program may be any software application including a search engine program. Data is replicated by complete tables according to this embodiment because CBO generally use table statistics in optimizing database requests (i.e., queries). In other embodiments of the present invention, other data replication schemes may be used.

In another embodiment of the present invention, at least one table of data is replicated from a database to an external program. The external program generates new statistical data for the replicated table of data and this new statistical data is used to update existing statistical data in the database. The DBMS CBO can then use the updated statistical data in calculating more optimal database queries. The new statistical data may include histograms, value distributions, selectivity information or any other type of statistical data used by the CBO. The new statistical data may be generated at fixed intervals of time or may result from the external program receiving a certain number of updates to the replicated table. This embodiment may be used with any type of database management system including relational and hierarchical DBMS. The external program may be various types of software applications including a search engine program.

At least one table of data is replicated from a database to an external program with any changes to the table in the database generating updates to the replicated table in the external program according to another embodiment of the present invention. This embodiment may also work with any type of DBMS—for example, relational and hierarchical—and with many types of external programs, including, for example, search engine programs. The external program either receives updates sent by the database or DBMS or requests information about updates to the replicated table. These updates are then executed on the replicated table and/or table indices in order to keep the information in the replicated table current. These updates may be received in the form of a change file (delta file) and may be executed at a periodic interval or as a result of receiving a certain number of updates (e.g., change files). The external program uses the updated replicated table to generate new statistical data, such as, for example, histogram, value distributions, and selectivity data, used by the CBO. This new statistical data generated by the external program is used to update the statistical data in the database.

An application may also use the external program to execute database requests (i.e., queries) on the replicated data instead of or in conjunction with using the database according to one embodiment of the present invention. Data is still replicated from the database to the external program typically in complete tables as previously discussed. The application may maintain a list of the replicated tables or data internally or with the database according to various embodiments of the present invention. The application may use this list in determine where to direct a database query—to the external program and its replicated data or to the DBMS and the database. The application then executes the query according to this determination. The application can successfully use this embodiment regardless of database type—for example, relational or hierarchical—and regardless of external program type, though a search engine may be a more efficient external program to use. In another embodiment of the present invention, the application may use a list of tables replicated to a plurality of external programs and determine which of the plurality of external programs or the database to use when sending database queries. In this embodiment, multiple external programs have replicated data from the database and the application uses a list of which tables have been replicated to which external program in determining where to direct database queries. In any embodiment, these database queries may be generated using a standard query description language such as SQL.

DETAILED DESCRIPTION

Figure 1:
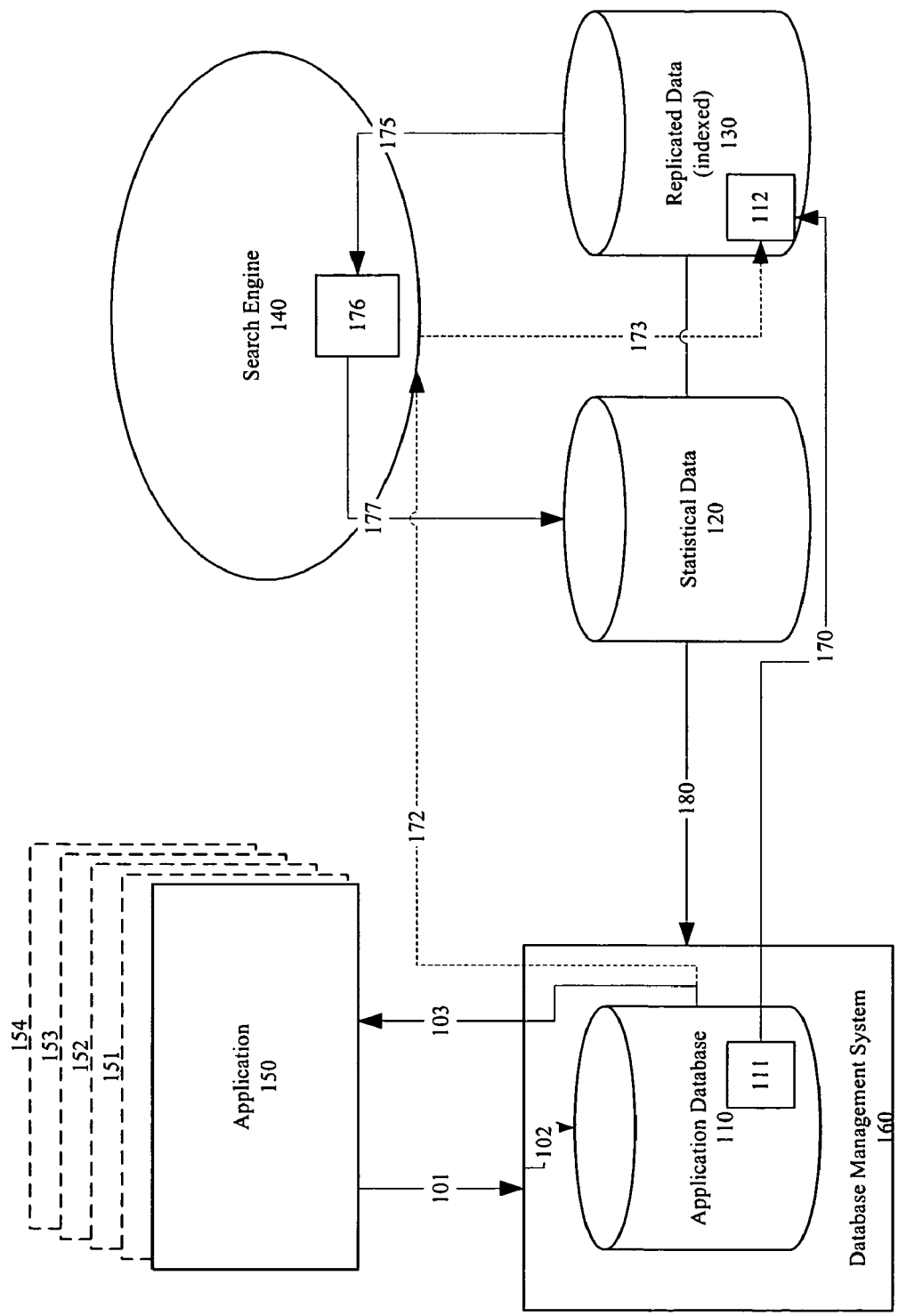
FIG. 1 is a diagram illustrating the process of using an external program to generate and/or update statistical information about one or more database tables according to one embodiment of the present invention.

In one embodiment of the present invention, data is replicated from a database to an external program (e.g., a search engine) to provide faster access to the data for an application. During the process of indexing this replicated data for the external program, statistical data is produced. This statistical data may be provided to the database as a beneficial effect of the replication of the data according to this embodiment. This embodiment solves the above problems by providing faster access to the data through an external program such as a search engine while relieving some or all of the burden on the DBMS to generate and update optimizer statistics.

Database tables are replicated in an external program where statistical information is generated and returned to the database according to one embodiment of the present invention. An external program is a separate program or process (i.e., separate from the database management system and database) that may run on the same computer or hardware as the database and/or DBMS or may run on other hardware. This process may free the database management system from the resource requirements of updating statistical information on its tables—and, in particular, the master tables—on which users may be trying to perform queries or reduce these resource requirements. In addition, the external program may provide more thorough and more frequently updated statistical information to the database, thereby improving the performance of the CBO in the database management system. According to this embodiment of the present invention, more frequent and/or more thorough generating and updating of statistical information may result with minimal additional impact on the database.

A database management system (DBMS) is a software application or set of applications that provide functionality for creating and maintaining one or more databases. For example, a database management system creating and managing relational databases is termed a relational database management system (RDBMS) and is only one type of database management system. Other types of database management systems may include hierarchical database management systems. Database management systems provide what are commonly known as back-end systems for maintaining and managing the data in the database. These back-end systems generally provide for database generation, maintenance, and query execution. In contrast, a front-end system is one or more applications that are part of the database management system that generally allow the user to enter data into a database, query data in the database, and format and generate visual or print reports from the data in the database. Some external software applications may also directly access the DBMS back-end and provide functionality similar to the front-end system of the DBMS.

A DBMS typically makes use of an interface through which an external application or front-end system interacts with a database. For example, an external application may translate a user action on a graphical user interface into Structured Query Language (SQL) statements that are sent to the database management system to run on the database. In this case, SQL serves as an integral part of the interface between the external application and the database management system. A database management system usually has a predefined interface through which external applications and its front-end system allow access to the database. SQL is only one example of a possible interface language.

In one embodiment of the present invention, an external program is used to calculate statistical information about all or part of the database in order to achieve the desired performance improvements. According to this embodiment, an external program stores replicated information from one or more tables in a database, calculates statistics for the replicated tables, and returns the calculated statistical information to the database management system. FIG. 1 is a diagram illustrating the process of using an external program to generate and/or update statistical information about one or more database tables according to one embodiment of the present invention. A DBMS 160 may be used to create and manage one or more databases 110 used by other software applications 150-154. FIG. 1 illustrates several applications 150-154 that may interact with a particular database 110 and its database management system 160. In the example shown in FIG. 1, only application interaction with a database and DBMS is shown. However, the model shown in FIG. 1 may apply to other scenarios involving other types of database users (as previously discussed) according to other embodiments of the present invention. In conventional DBMS interaction with a software application, an application 150 may interact with the database 110 by delivering requests 101 such as, for example, queries to the database management system 160 which in turn executes 102 the requests on the database 110. Results are returned 103 by the DBMS 160 to the application 150. An external program 140 is used in addition to this conventional model according to one embodiment of the present invention. The external program 140 can be a variety of software programs, including, for example, a search engine program according to one embodiment of the present invention. For example, the SAP® retrieval and classification engine TREX may serve as the external search engine program.

According to the embodiment illustrated in FIG. 1, a table 111 of data is replicated 170 from the database 110 to the external program 140. According to this embodiment, the data is replicated by table because database optimizer statistics are typically calculated on a table of data as a whole. In other embodiments of the present invention reflecting different optimizer statistics schemes, data may be replicated in a manner other than by complete table as shown in FIG. 1. In yet other embodiments of the present invention, data may be replicated to facilitate using the external program for database query execution in addition to the generating and updating of database optimizer statistics. The external program 140, in this example a search engine, provides redundant storage 112 of the indexed table data 111. According to one embodiment of the present invention, the entire database 110 is replicated 170 to the external program 140 so that the external program 140 can generate and/or update statistical data 120 based on the replicated data 130 for the entire database 110. Regardless of the replication scheme being used, the database 110 is still responsible for the data overall in this embodiment of the present invention. In other words, the database 110 and the DBMS 160 continue to be responsible for correct data persistence, ensuring transactional consistency of the data, and for rolling back transactions, if necessary. The external program 140 stores replicated data 130 but does not replace the database 110 and DBMS 160 for responsibility of the data—the database 110 serves as the master system.

The external program 140 can retrieve 175 data from the replicated table 112 and perform calculations 176 on the data in order to generate 177 statistical data 120 related to the replicated table 112 according to the embodiment reflected in FIG. 1. These calculations 176 may be similar to those performed in the conventional generation of database optimizer statistics and may result in the generation 177 of, for example, histograms, value distributions, and/or selectivity information. This statistical data 120 may then be transferred 180 back to the database management system 160 by the external program 140.

Statistical data is typically generated to determine or approximate the data distribution of the values in an attribute of a table (relation). A query optimizer may use these statistics to determine result sizes or selectivity of query execution plans as part of its query optimization process. The statistical data 120 generated 177 by the external program 140 may include histograms, value distributions, and other selectivity information according to one embodiment of the present invention. All three aforementioned types represent the distribution of values in an attribute (column) of a table of a database. Histograms approximate the frequency distribution of values in an attribute of table and are typically calculated for key attributes that reflect relations across a database. Value distributions may reflect the distribution of values in an attribute determined from sampling the rows of the table or by examining all rows, where resources permit. In one embodiment of the present invention, all rows are used rather than sampling because doing so does not impact other users of the database and improves the resulting value distribution. Other selectivity information may include polynomial or mathematical distributions approximating the frequency distribution of values in an attribute. This statistical data is important because it allows a DBMS Cost Based Optimizer (CBO) to estimate query result sizes and access plan costs.

The use of the replicated table 112 in the replicated data 130 by the external program 140 is only relevant to the extent that the data in the replicated table 112 is current and matches the data in the corresponding database 110 table 111. In order to maintain the currency of the data in the replicated table 112, updates reflecting any changes in the database 110 table 111 need to be captured and transmitted 172 to the external program 140, with the external program 140 implementing 173 these updates on the replicated data 130. In one embodiment of the present invention, the external program collects a series of updates (e.g., as delta files) to the replicated data 130 and either regularly re-indexes all the replicated data 130 using the updates or adds the updates (e.g., delta files) to the existing indices. The updates may be sent to the external program 140 by the DBMS 160 in one embodiment while the external program 140 may request and/or retrieve the updates from the DBMS 160 in another embodiment of the present invention. In another embodiment, a notification message is sent to the external program 140 when the information in the database 110 table 111 is updated. This updating process may occur at some designated time interval in one embodiment of the present invention. For example, the updates may be processed every 30 minutes, every 2 hours, twice a day, once a day, or once a week. In another embodiment, the updating process may occur when a certain number of updates have been accumulated. For example, every time 15 updates have been accumulated, the updates may be processed. In another embodiment of the present invention, a user may schedule the updates. For example, an administrator for the external program 140 may schedule the execution of the updates. The new updated data is then usable only after the replicated data 130 has been re-indexed or the updates have been added to the existing indices.

In another embodiment of the present invention, updates to the replicated data may also be triggered and/or provided by the application itself. For example, as soon as the application makes an update to the database, it also sends a corresponding update call to the search engine and provides appropriate error handling (e.g., storing the updates in a log table on the database) if the search engine (or other external program) is not available. When the search engine is again available, it could read the updates queued in the log table from the database as part of the startup procedure and incorporate the accumulated updates into the replicated data.

During the indexing or re-indexing of the replicated data 130, the external program 140 may collect a lot of statistical data 120 concerning the replicated data 130. According to one embodiment of the present invention, the generation 177 of the statistical data 120 is performed when the replicated data 130 is retrieved 175 and re-indexed 176 by the external program 140. According to this embodiment of the present invention, the statistical data 120 generated 177 is the same as the statistical data required by the database CBO as previously discussed. The external program 140 provides this statistical data 120 to the database 110 and DBMS 160 where the statistical data may serve as the input for mathematical algorithms that calculate statistical optimization in the CBO. Because the external program 140 is only providing statistical data 120 to the database 110 and DBMS 160, the external program 140 does not need know how the CBO operates or the mathematical algorithms it uses—both of which are generally closely guarded secrets of the respective DBMS 160 companies.

Figure 2:
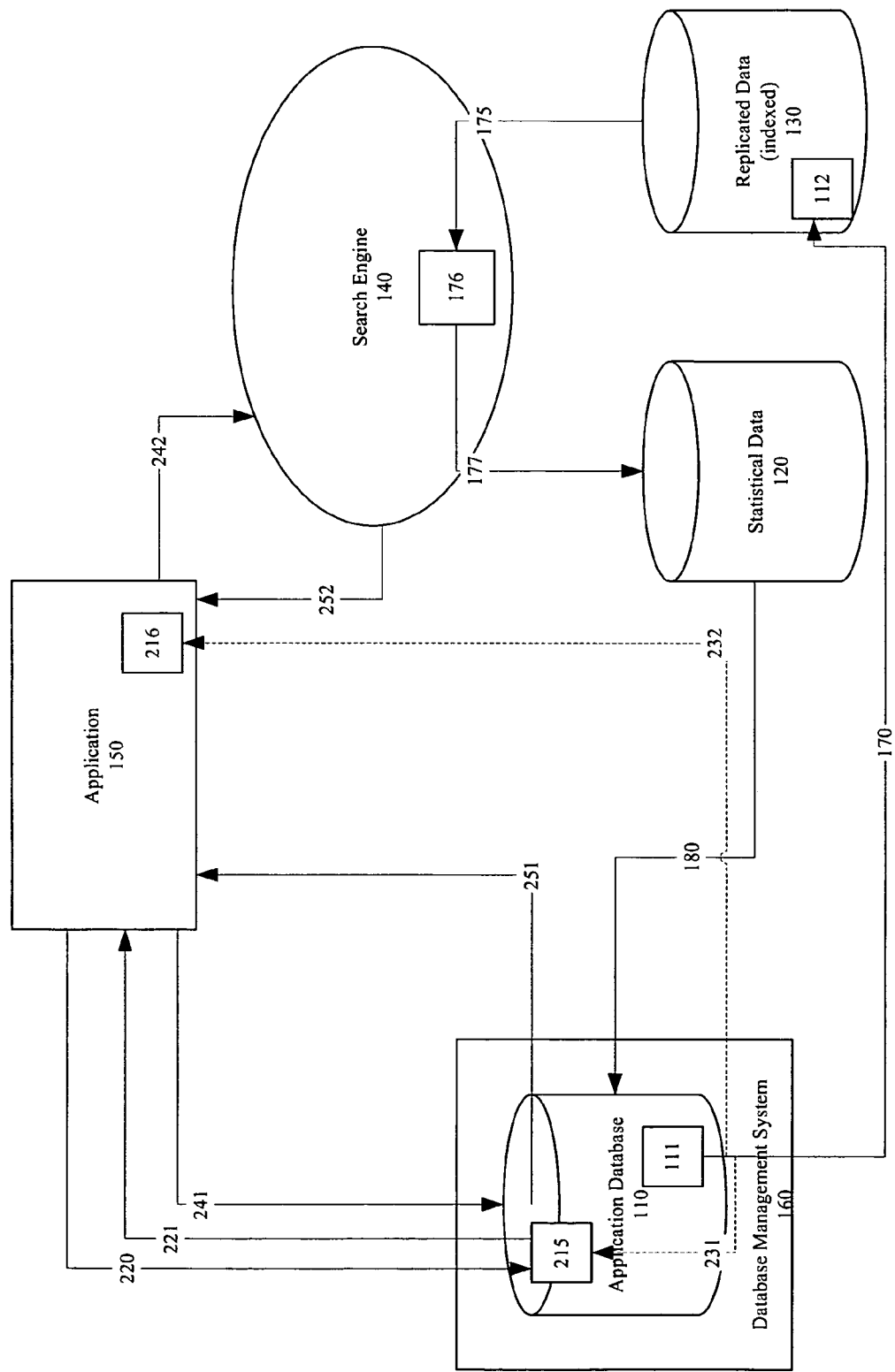
FIG. 2 is a diagram illustrating a process where an application uses the replicated data in the external program according to one embodiment of the present invention.

A search engine or other external program 140 may also be able to provide faster access to the replicated data 130 than a database 110 or DBMS 160 can provide to the database 110 data. For this reason, an application 150 may benefit from accessing the replicated data 130 in the external program 140 over trying to access the database 110 directly. FIG. 2 is a diagram illustrating a process where an application uses the replicated data in the external program according to one embodiment of the present invention. In one embodiment, an application program 150 may be set by default to use the external program 140 to retrieve data and perform database queries. If the external program 140 is not available or reachable because, for example, the network is down or if the external program 140 is itself down, the application 150 may then use the database 110 according to one embodiment of the present invention. This embodiment requires the application 150 to "know about" or be configured to use both the external program 140 and the database 110/DBMS 160. If the application is not configured to use both the external program 140 and the database 110/DBMS 160, this option is not available. The application 150 may also maintain a list 215, 216 of the database 110 tables 111 replicated 170 to the external program 140 according to one embodiment of the present invention. This list 215 may be maintained in the database 110 and retrieved 220, 221 by the application 150 for use when planning database queries according to one embodiment of the present invention. The application 150 may also internally maintain the list 216 of replicated tables 112, which may be used when planning database queries according to another embodiment of the present invention. In either embodiment, the list 215, 216 needs to be updated 231, 232 when additional tables are replicated 170 to the external program 140 or are no longer part of the replicated data 130 in the external program 140. The application 150 uses this list 215, 216 in determining where it will send database queries 241, 242—whether to send requests 242 to the external program 140 or send requests 241 to the database 110/DBMS 160. The application 150 will receive responses 251, 252 to these database queries from respectively the database 110/DBMS 160 and the external program 140 to which the queries were sent. In another embodiment of the present invention, the application may use multiple external programs, maintained in the list, with replicated data from the database when determining where to direct database queries. In addition to the potentially improved access to the data, the use of the external program 140 by the application 150 when transmitting database queries 242 reduces the load on the database 110 and DBMS 160 and may result in additional database efficiency.

What is claimed is:

1. A method for searching a database using an external program, comprising the steps of:
    as part of a database update function:
        replicating a table, including data records stored in the table, from the database to the external program, wherein the external program uses processing resources separate from those of a database manage system that manages the database;
        adding the table to a list at the database for tables that have been replicated to the external program;
        at the external program, generating a statistical data item for the replicated data records, wherein the statistical data item represents a distribution of values in an attribute of the replicated table;

replicating the statistical data item to the database for use by a query optimizer in the database;
capturing changes to the data records in the database;
transmitting the captured changes to the external program;
updating the statistical data item at the external program according to the changes;
replicating the updated statistical data item to the database;
in response to a search request:
determining whether to dispatch a search to the external program or the database,
if choosing the external program, conducting the search at the external program; and
if choosing the database, calculating, by the query optimizer, optimal database queries at the database using the replicated statistical data item.

2. The method according to claim 1, wherein the statistical data item is at least one of a histogram, and a selectivity information item.

3. The method according to claim 1, wherein the database management system is a relational database management system.

4. The method according to claim 1, wherein the external program is an indexing program for a search engine.

5. The method of claim 1, wherein the external program is executed on a separate computing device from the database management system.

6. A method for searching a database using an external program, comprising the steps of:
as part of a database update function:
replicating a table, including data records stored in the table, from the database to the external program, wherein the external program uses processing resources separate from those of a database manage system that manages the database;
adding the table to a list at the database for tables that have been replicated to the external program;
generating a statistical data item at the external program for the replicated data records, wherein the statistical data item represents a distribution of values in an attribute the replicated table;
updating an existing statistical data item in the database as a function of the statistical data item generated at the external program, wherein the updated existing statistical data item provides statistical data to be used by a query optimizer in the database;
in response to a search request:
determining whether to dispatch a search to the external program or the database;
if choosing the external program, conducting the search at the external program; and
if choosing the database, calculating, by the query optimizer, optimal database queries at the database using the replicated statistical data item.

7. The method according to claim 6, wherein the existing statistical data item is at least one of a histogram, and a selectivity information item.

8. The method according to claim 6, wherein the database management system is a relational database management system.

9. The method according to claim 6, wherein the external program is an indexing program for a search engine.

10. The method according to claim 6, wherein the statistical data item generated at the external program is at least one of a histogram, and a selectivity information item.

11. The method according to claim 6, wherein the generating step occurs at a fixed periodic interval.

12. The method according to claim 11, wherein the updating step occurs at a fixed periodic interval.

13. The method according to claim 6, wherein the updating step replaces the statistical data item in the database with the generated statistical data item.

14. The method of claim 6, wherein the external program is executed on a separate computing device from the database management system.

15. A method for searching a database using an external program, comprising the steps of:
as part of a database update function:
replicating a table, including data records stored in the table, from the database to the external program, wherein the external program uses processing resources separate from those of a database manage system that manages the database;
adding the table to a list at the database for tables that have been replicated to the external program;
updating, by the external program, the replicated data records as a function of a change item received from at least one of the database and the database management system;
generating a new statistical data item at the external program for the replicated data records, wherein the statistical data item represents a distribution of values in an attribute of the replicated table;
updating an existing statistical data item in the database as a function of the new statistical data item generated at the external program, wherein the updated existing statistical data item provides statistical data used by a query optimizer in the database;
in response to a search request:
determining whether to dispatch a search to the external program or the database;
if choosing the external program, conducting the search at the external program; and
if choosing the database, calculating, by the query optimizer, optimal database queries at the database using the replicated statistical data item.

16. The method according to claim 15, wherein the existing statistical data item is at least one of a histogram, a value distribution, and a selectivity information item.

17. The method according to claim 15, wherein the database management system is a relational database management system.

18. The method according to claim 15, wherein the external program is a search engine program.

19. The method according to claim 15, wherein the updating the replicated data records step further comprises:
generating, by the at least one of the database and the database management system, a change file, the change file containing the change item reflecting a change in the data records; and
receiving, by the external program, the change file.

20. The method according to claim 15, wherein the new statistical data item is at least one of a histogram, a value distribution, and a selectivity information item.

21. The method according to claim 15, wherein the generating step occurs at a fixed periodic interval.

22. The method according to claim 15, wherein the updating step occurs at a fixed periodic interval.

23. The method according to claim 15, wherein the change item is generated by an application accessing the database.

24. The method according to claim 15, the update step further comprising:

updating, by the external program, the replicated data records as a function of a change item, the change item received from an application accessing the database, the application providing the change item to the external application and at least one of the database and the database management system.

25. The method of claim 15, wherein the external program is executed on a separate computing device from the database management system.

26. A computer-readable physical storage containing a set of instructions adapted to be executed on a processor to implement a method for searching a database using an external program, the method comprising the steps of:
as part of a database update function:
replicating a table, including data records stored in the table, from the database to the external program, wherein the external program uses processing resources separate from those of a database manage system that manages the database;
adding the table to a list at the database for tables that have been replicated to the external program;
at the external program, generating a statistical data item for the replicated data records, wherein the statistical data item represents a distribution of values in an attribute of the replicated table;
replicating the generated statistical data item to the database for use by a query optimizer in the database;
capturing changes to the data records in the database;
transmitting the captured changes to the external program;
updating the statistical data item at the external program according to the changes;
replicating the updated statistical data item to the database;
in response to a search request:
determining whether to dispatch a search to the external program or the database;
if choosing the external program, conducting the search at the external program; and
if choosing the database, calculating, by the query optimizer, optimal database queries at the database using the replicated statistical data item.

27. The computer-readable physical storage of claim 26, wherein the external program is executed on a separate computing device from the database management system.

28. A computer-readable physical storage containing a set of instructions adapted to be executed on a processor to implement a method for search a database using an external program, the method comprising the steps of:
as part of a database update function:
replicating a table, including data records stored in the table, from the database to the external program, wherein the external program uses processing resources separate from those of a database manage system that manages the database;
adding the table to a list at the database for tables that have been replicated to the external program;
generating a new statistical data item at the external program for the replicated data records, wherein the new statistical data item represents a distribution of values in an attribute of the replicated table;
updating an existing statistical data item in the database as a function of the generated new statistical data item, wherein the new statistical data item provides statistical data used by a query optimizer in the database;
in response to a search request:
determining whether to dispatch a search to the external program or the database;
if choosing the external program, conducting the search at the external program; and
if choosing the database, calculating, by the query optimizer, optimal database queries at the database using the replicated statistical data item.

29. The computer-readable physical storage of claim 28, wherein the external program is executed on a separate computing device from the database management system.

30. A computer-readable physical storage containing a set of instructions adapted to be executed on a processor to implement a method for searching a database using an external program, the method comprising the steps of:
as part of a database update function:
replicating a table, including data records stored in the table, from the database to the external program, wherein the external program i uses processing resources separate from those of a database manage system that manages the database;
adding the table to a list at the database for tables that have been replicated to the external program;
updating, by the external program, the replicated data records as a function of a change item received from at least one of the database and database management system;
generating a new statistical data item at the external program for the replicated data, wherein the new statistical data item represents a distribution of values in an attribute of the replicated table;
updating an existing statistical data item in the database as a function of the generated new statistical data item, the new statistical data item providing statistical data used by a query optimizer in the database;
in response to a search request:
determining whether to dispatch a search to the external program or the database;
if choosing the external program, conducting the search at the external program; and
if choosing the database, calculating, by the query optimizer, optimal database queries at the database using the replicated statistical data item.

31. The computer-readable physical storage of claim 30, wherein the external program is executed on a separate computing device from the database management system.

32. A method for reducing query execution time in a database, comprising the steps of:
as part of a database update function:
replicating a table, including data records stored in the table, from the database to the external program, wherein the external program uses processing resources separate from those of a database manage system that manages the database;
adding the table to a list at the database for tables that have been replicated to the external program;
generating, by the external program, a statistical data item describing the arrangement of data in the replicated table, wherein the statistical data item represents a distribution of values in an attribute of the replicated table;
sending the statistical data item from the external program to the database, wherein the statistical data item provides statistical data to be used by a query optimizer in the database;
in response to a search request:
determining whether to dispatch a search to the external program or the database;

if choosing the external program, conducting the search at the external program; and if choosing the database, calculating, by the query optimizer, optimal database queries at the database using the replicated statistical data item.

33. The method of claim 32 wherein the statistical data item is generated to index data stored in the replicated table for use by the external program.

34. The method of claim 32, wherein the external program is executed on a separate computing device from the database management system.

* * * * *